June 22, 1926.
B. ROACH
NUT LOCK
Filed March 29, 1926
1,589,562
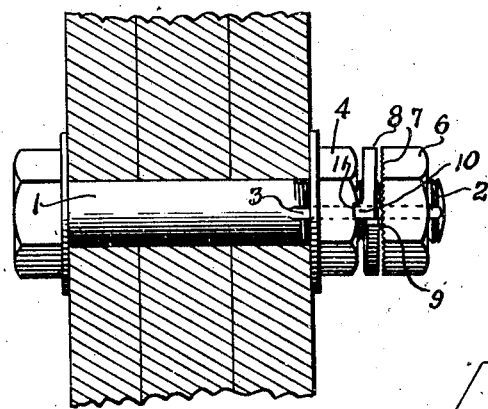
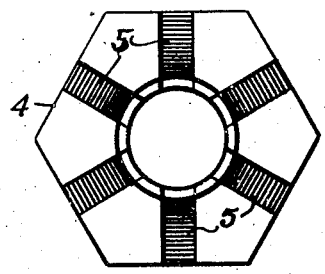
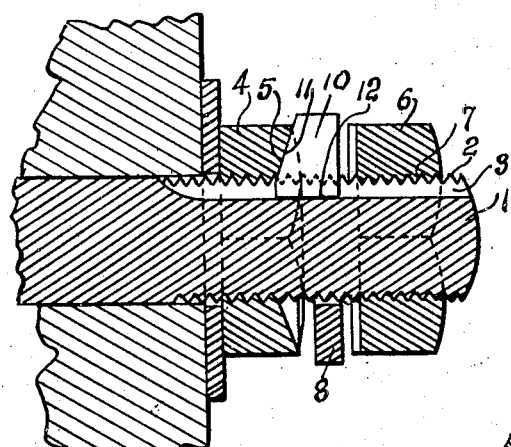
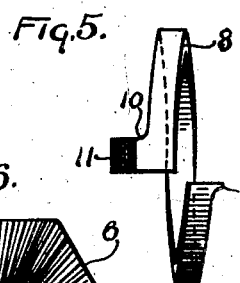
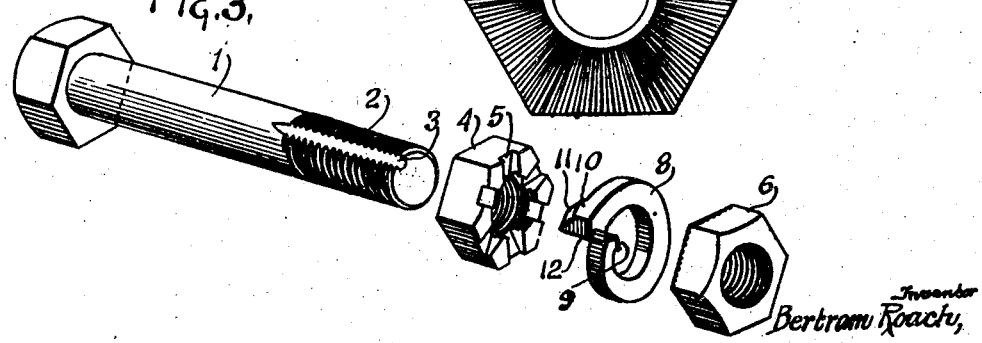
Inventor
Bertram Roach,
By Toulmin & Toulmin
Attorneys Patented June 22, 1926.

1,589,562

UNITED STATES PATENT OFFICE.

BERTRAM ROACH, OF DAYTON, OHIO.

NUT LOCK.

Application filed March 29, 1926. Serial No. 98,128.

This invention relates to nut locks.

The object of the invention is to provide means whereby nuts can be positively held against rotation. The invention consists in providing a nut with a plurality of grooves, the bottoms of which are tapered from the outer edge toward the peripheral center to form cam surfaces and a second nut having a series of grooves radiating from the center thereof, a spring washer being interposed between said nuts, said washer having at one end a lug provided with a cam surface to co-act with the cam surfaces in one nut and another lug at its other end to enter the grooves in the other nut, the first mentioned lug also being adapted to enter a groove in the usual threaded bolt, all as hereinafter described.

In the accompanying drawings:

Figure 1 is a plan view of my improved nut lock in clamping position.

Figure 2 is a detail assembly sectional view of the device.

Figure 3 is a perspective view of the several elements in position for assembly.

Figure 4 is a plan view of the inner face of one nut.

Figure 5 is an elevation of the spring washer.

Figure 6 is a plan view of the inner face of the other nut.

Referring to the drawings I provide a bolt 1 of the usual approved form and dimensions, one end of said bolt being threaded as indicated at 2, and having a groove 3. A nut 4, which may be termed the positioning nut, has a plurality of grooves in one face whose bottoms are tapered from the outer edge of the nut toward the peripheral center thereof to form cam surfaces 5. A second nut 6 which I will term the tightening nut, has a series of grooves 7 in one face radiating from the center thereof. A spring washer 8 has at its ends lugs 9 and 10, extending at right angles thereto and in opposite directions. The lug 9 is bevelled on its end and adapted to successively engage with the grooves 7 in the nut 6 when the latter is applied to the bolt for holding the parts in locked position. The lug 10 is tapered to form an inclined cam surface, as shown at 11, adapted to co-act with any one of the inclined cam surfaces 5. The lug 10 is also extended inwardly of the inner periphery of the washer, as shown at 12, and shaped to enter the groove 3 in the bolt 1.

In operation the nut 4 is positioned on the bolt 1 with one of the grooves 5 in line with the groove 3. The washer 8 is then placed on the bolt with the portion 12 of the lug 10 in the groove 3 in the bolt, after which the nut 6 is placed on the bolt and as it is tightened against the washer 8 the co-acting cam surfaces 5 and 11 will cause not only a tightening of the washer 8 and nut 4 but also a further wedging of the lug 10 into the groove in the bolt 1, thereby effecting a locking of the several parts which is highly efficient. It will further be noted that my improved nut lock is inexpensive and easy to assemble and disassemble.

It will be understood that I desire to comprehend within my invention such modifications as may be necessary to adapt it to varying conditions and uses.

Having thus fully described my invention what I claim as new and desire to secure by Letters Patent, is:—

1. In a nut lock, the combination with a spring washer having at its ends lugs oppositely disposed, one of said lugs being larger than the other and having a tapered portion forming a cam surface, of a nut having radiating grooves in one face thereof, the smaller of said lugs being adapted to be seated in any one of said grooves, and a second nut having in one face a plurality of grooves with tapered bottoms forming cam surfaces adapted to co-act with the cam surface on the larger lug.

2. In a nut lock, the combination with a bolt, having a groove, of a nut adapted to be placed on said bolt and having in one face a plurality of grooves with tapered bottoms forming cam surfaces, a second nut on said bolt having radiating grooves in one face, a spring washer surrounding said bolt and interposed between said nuts, and lugs on the ends of said washer adapted to be respectively seated within the grooves of said nuts, one of said lugs being larger than the other and having a tapered portion forming a cam surface to co-act with the cam surface in one of the grooves on the first mentioned nut and an inwardly extending portion to enter the groove in said bolt.

In testimony whereof I affix my signature.

BERTRAM ROACH.